United States Patent [19]

Mann

[11] Patent Number: 4,945,209

[45] Date of Patent: Jul. 31, 1990

[54] WELDING GUN SWIVEL

[75] Inventor: Robert N. Mann, Mississauga, Canada

[73] Assignee: Mig Vac Inc., Mississauga, Canada

[21] Appl. No.: 434,273

[22] Filed: Nov. 13, 1989

[51] Int. Cl.$^5$ .................... B23K 9/12

[52] U.S. Cl. .................... 219/137.31; 219/136; 219/137.41

[58] Field of Search .................... 219/136, 137.31, 137.9, 219/137.63

[56] References Cited

U.S. PATENT DOCUMENTS 3,689,733 9/1972 Matasovic .................... 219/137.63
4,496,823 1/1985 Mann .................... 219/137.9
4,549,068 10/1985 Kensrue .................... 219/137.63
4,727,238 2/1988 Mann .................... 219/137.31

FOREIGN PATENT DOCUMENTS 1237346 6/1986 U.S.S.R. .................... 219/137.9

*Primary Examiner*—Clifford C. Shaw
*Attorney, Agent, or Firm*—Sim & McBurney

[57] ABSTRACT

Additional flexibility of positioning of a welding gun head relative to a smooth surfaced flexible hose is provided by a generally elongate swivel joint positioned between the hose and a bellows connector. The swivel joint comprises two parts which rotate relative to one another about the longitudinal axis of the joint.

8 Claims, 3 Drawing Sheets

WELDING GUN SWIVEL

FIELD OF INVENTION

The present invention relates to welding guns.

BACKGROUND TO THE INVENTION

Welding guns for application of a weld to a desired site generally are provided at the remote end of a conduit in which is located a continuous weld wire extending from a wire source and a power cable extending from a power source. Often such welding guns are of the vacuum type which permit undesirable fumes to be removed from the welding gun site through the conduit.

Traditionally this conduit has been of corrugated construction along the whole length thereof, but the structure has no support for the weld wire and power cable and can wear through to expose the electrical power cable.

In my U.S. Pat. No. 4,496,823, the disclosure of which is incorporated herein by reference, there is described a novel multipassage flexible smooth-surfaced conduit which overcomes the problems of the prior art. In some instances, however, the conduit of my U.S. Pat. No. 4,496,823 is not sufficiently flexible to permit the ideal maneuverability of the welding gun head to make welds, particularly in hard-to-get-at locations.

For this reason, I invented a bellows-like flexible connector to connect the smooth-surfaced conduit to the welding gun head to permit the welding gun to be turned about universally with respect to the conduit. That structure forms the subject of my U.S. patent application Ser. No. 307,921 filed Feb. 9, 1989, the disclosure of which is incorporated herein by reference.

SUMMARY OF INVENTION

In accordance with the present invention, a further degree of flexibility is provided to the welding gun by providing a swivel joint between the downstream end of the conduit and the upstream end of the bellows-like connector, to permit rotation of the bellows about the longitudinal axis of the conduit.

DESCRIPTION OF PREFERRED EMBODIMENT

Figure 1:
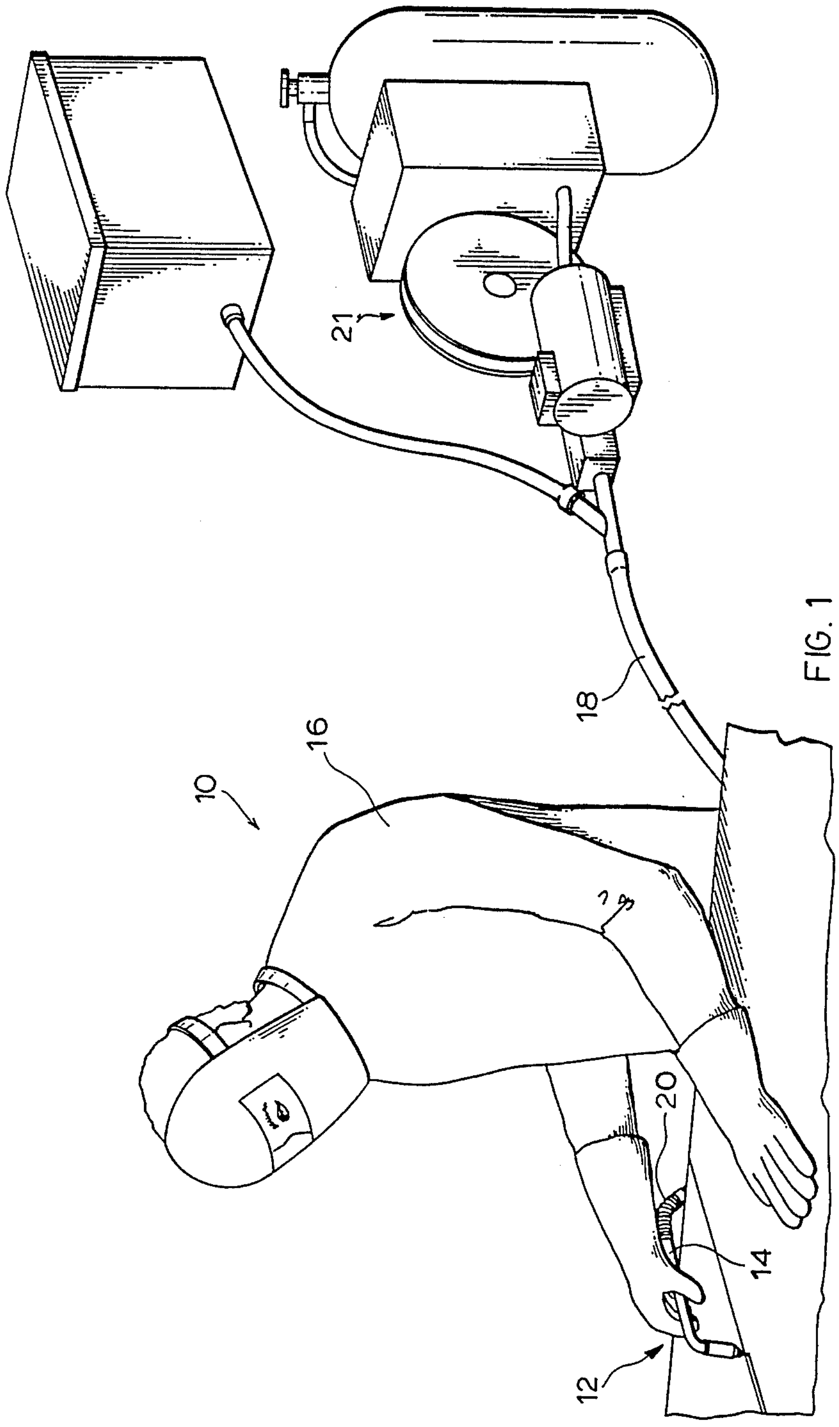
FIG. 1 is a schematic representation of a fume-extracting welding apparatus into which can be incorporated a swivel joint in accordance with one embodiment of the invention.

Referring to the drawings, FIG. 1 illustrates schematically a fume-extracting welding gun 10 including a head portion 12, a control handle portion 14 gripped by a welder 16 during operation, a flexible connector hose portion 18 and a services supply portion 21. The connector hose 18 preferably is constructed as described in my aforementioned U.S. Pat. No. 4,496,823. The welding gun head 12 may be constructed as described in my U.S. Pat. No. 4,727,238, the disclosure of which is incorporated herein by reference, or as described in my copending U.S. patent application Ser. No. 434,275 filed 11/13/89 ("Nozzle"), the disclosure of which is incorporated herein by reference.

The hose 18 is connected to the welding gun head 12 by a bellows connector 20, which may be constructed as described in my aforementioned U.S. patent application Ser. No. 307,921.

Figure 2:
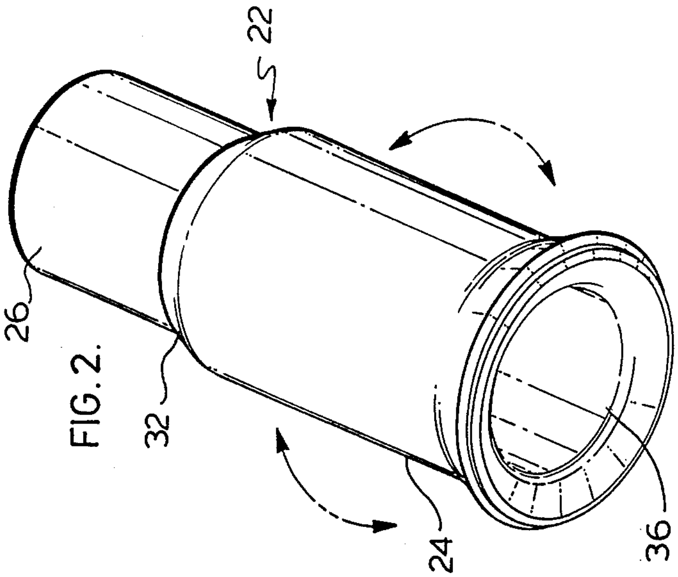
FIG. 2 is a perspective view of a swivel joint element provided in accordance with one aspect of the present invention.
Figure 3:
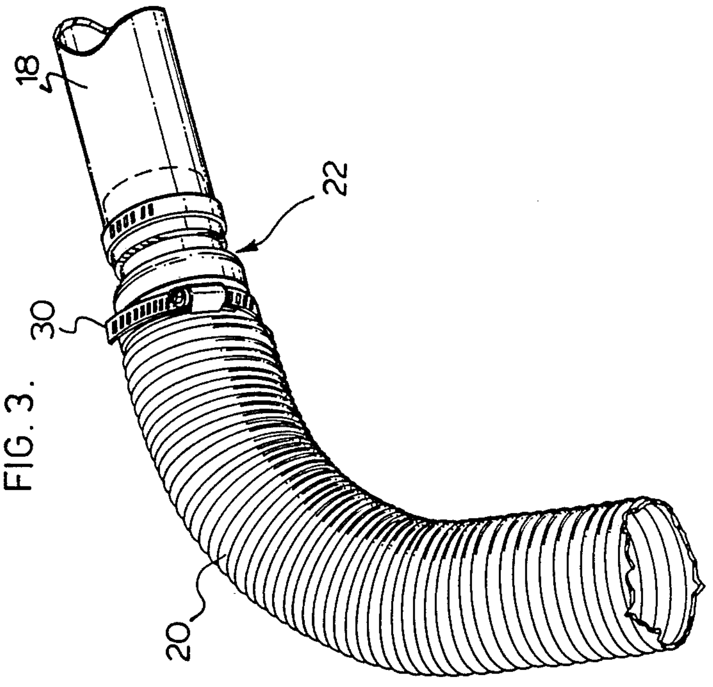
FIG. 3 is a perspective view of the joint of FIG. 2 located joining a bellows-like connector and a smooth-surfaced conduit.
Figure 4:
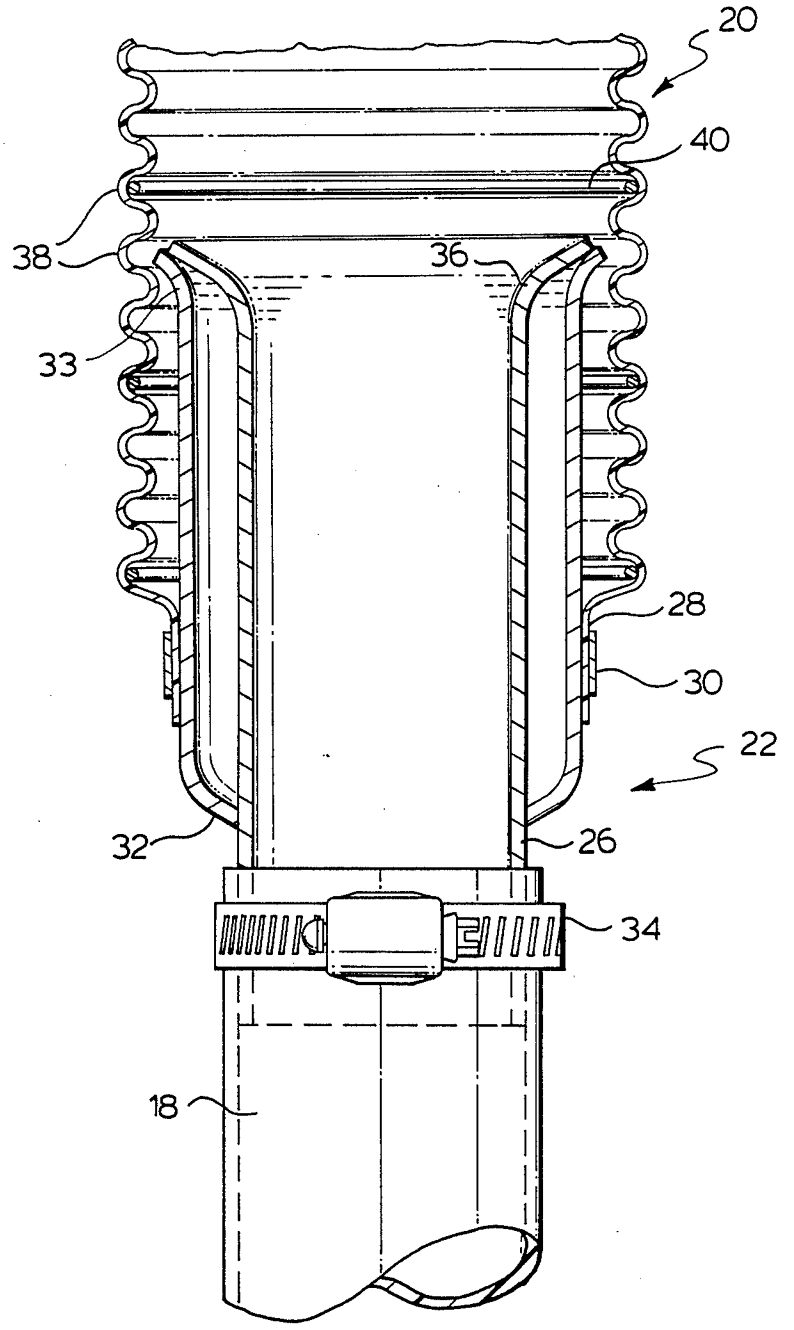
FIG. 4 is a sectional view of the arrangement of FIG. 3.

Turning now to FIGS. 2 to 4, the invention herein resides in the placing of a swivel joint 22 between the downstream end of the hose 18 and the upstream end of the bellows connector 20. The swivel joint 22 comprises two parts 24 and 26 which are both of generally cylindrical shape and which are positioned relative to one another to permit relative rotation about the axis of the swivel joint 22. The two parts 24 and 26 often are formed of different metals.

The first part 24 is provided with an outside diameter corresponding to the inside diameter of a tubular extension 28 of the bellows connector 20, so as to be received in sliding fit therein and to be clamped in immovable relationship by an outer clamp 30.

The first part 24 has a cylindrical shape for most of its length and has an inwardly-flared or frustoconical portion 32, which terminates at an inner diameter and an outwardly-flared portion 33 at the other end, which terminates at a second outside diameter.

The second part 26 is provided with an outside diameter corresponding to the inside diameter of the hose 18, so as to receive the hose in sliding fit therein and to be clamped in immovable relationship by an outer clamped 34.

The second part 26 has a cylindrical shape for most of its length and has an outwardly-flared or frustoconical portion 36 at the end opposite to that joined to the hose 18, which terminates in a second outside diameter. The inside diameter of the downstream end of the inwardly-flared portion 32 corresponds to the first outside diameter of part 26 while the outer diameter of the downstream end of the outwardly-flared portion 36 corresponds to the second outside diameter, so that the surfaces bear against each other to provide the rotational motion.

The bellows connector 20 comprises a plurality of individual bellow elements 38 which are integrally joined to each other so as to be resiliently flexible and permit universal movement of the welding gun head 12. To prevent inadvertent crushing and collapse of the bellows connector 20 in use, such as may occur when the welding gun is gripped at the bellows connector 20, a series of resilient rings 40 may be provided spaced apart substantially equally along the length of the bellows connector. When employed, the rings are located in the apices of individual ones of the bellows elements 38.

The bellows connector 20 and the swivel joint 22 combine to provide a considerable degree of flexibility for the operation of the welding gun 10 to position the welding gun head 12 at any desired orientation with respect to the hose.

SUMMARY OF DISCLOSURE

In summary of this disclosure, the present invention provides a novel structure in the form of a swivel which permits greater flexibility of position of a welding gun head by an operator. Modifications are possible within the scope of this invention.

What I claim is:

1. A welding gun, comprising:

a welding gun head for applying a weld to a site, a conduit for conveying an electrical power cable to said welding gun head, flexible bellows connector means connected at one end to said welding gun head, and a generally elongate swivel connector means comprising two interacting parts arranged to swivel relative to one another about a longitudinal axis, said swivel connector means having one of said interacting parts connected to the other end of said flexible bellows connector means and having the other of said interacting parts connected to said conduit.

2. The welding gun of claim 1 wherein said other interacting part has an outside diameter corresponding to the inside diameter of said conduit and said conduit is received in sliding fit with said other interacting part, and an outer clamp is provided to effect a secure connection.

3. The welding gun of claim 2 wherein said one interacting part has an outside diameter corresponding to the inner diameter of a tubular extension of said bellows connector means at said other end thereof and said one interacting part is received in sliding fit with said tubular extension, and an outer clamp is provided to effect a secure connection.

4. The welding gun of claim 1 wherein said swivel connector means comprises:

a first interacting part having a tubular portion of a first outside diameter and a first flared portion which flares inwardly to a second outside diameter at one end thereof and a second flared portion which flares outwardly at the other end thereof, and a second interacting part having a tubular portion having said second outside diameter received in sliding fit with said tubular portion of said first part and a flared portion overlapping and bearing in rotational relationship with said second flared portion of said first part and which flares outwardly.

5. The welding gun of claim 1, wherein a plurality of resilient rings is disposed internally and at longitudinally-spaced locations along the length of said bellows connector means to resist deformation of said bellows connector means upon the external application of radially-inward pressure thereto.

6. The welding gun of claim 5 wherein said flexible bellows connector means is of generally cylindrical shape and comprising a plurality of individual bellows members integrally joined one to another to be resiliently flexible.

7. The welding gun of claim 6 wherein said resilient rings are located at the radially-outward apex of individual ones of said individual bellows members and there is a lesser plurality of said resilient rings than of said individual bellows means and said resilient rings are substantially equally spaced apart along the length of said bellows connection and located in said apices.

8. The welding gun of claim 7 wherein said flexible bellows connector means includes elongate smooth surfaced tubular portions at each longitudinal end thereof to effect connection to said welding gun head and to said one interacting part.

* * * * *